Aug. 17, 1965 A. GOLDSTEIN 3,200,806
FOLDING BARBECUE CONSTRUCTION
Filed July 29, 1963 2 Sheets-Sheet 1
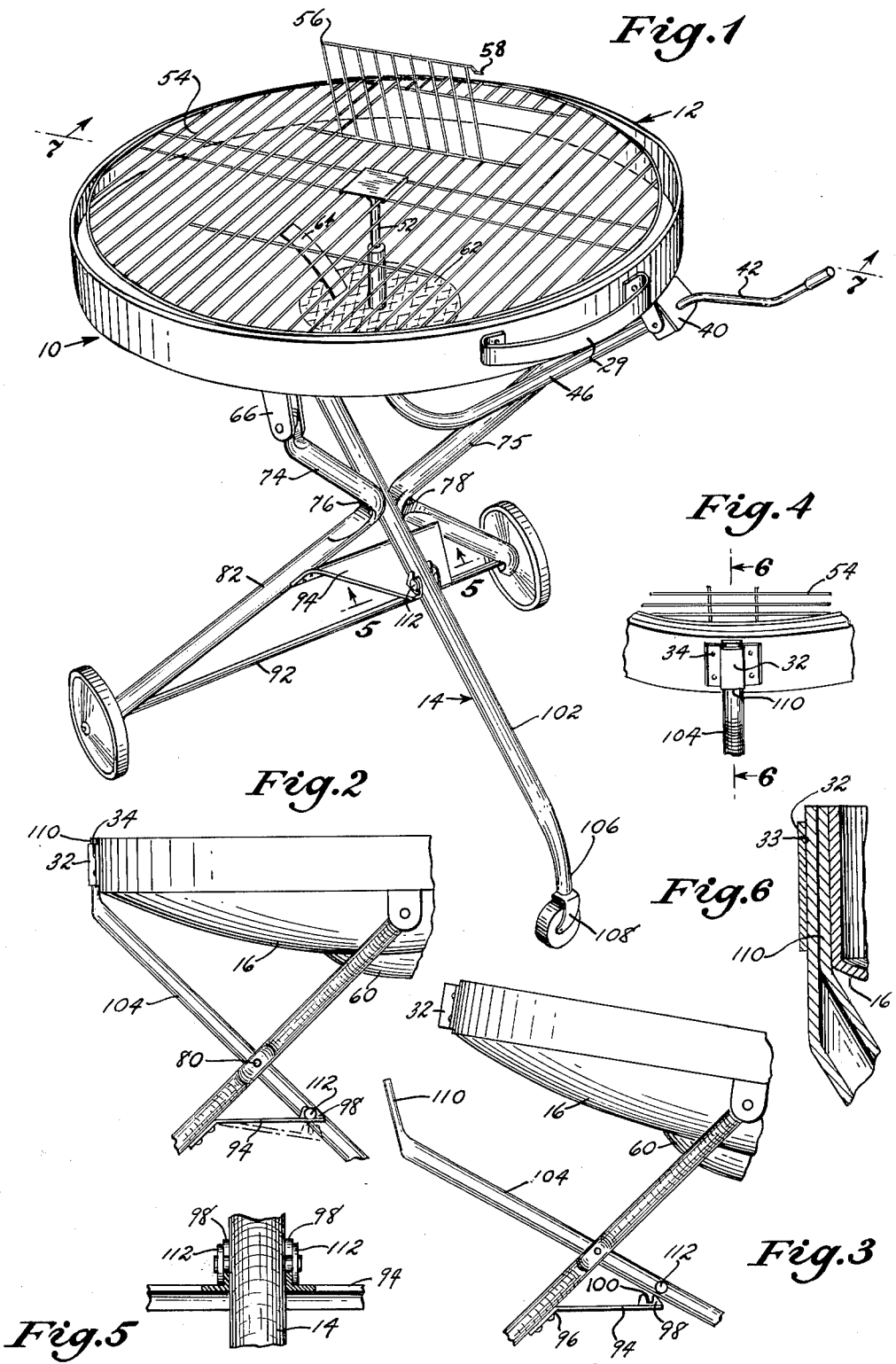

Aug. 17, 1965  A. GOLDSTEIN  3,200,806
FOLDING BARBECUE CONSTRUCTION
Filed July 29, 1963  2 Sheets-Sheet 2

3,200,806
FOLDING BARBECUE CONSTRUCTION
Arnold Goldstein, 3363 Trexler Blvd., Allentown, Pa.
Filed July 29, 1963, Ser. No. 298,053
1 Claim. (Cl. 126—25)

This invention relates to barbecue constructions, and more particularly to the portable barbecue grills having a tripod-type support, which can be folded against the grill when not in use.

Outdoor cooking during warm weather has become increasingly popular, and an ever growing number of people are obtaining outdoor grills of the barbecue or charcoal type. When the grill is not in use, it may be left outside and during the inclement weather periods the grill may be also removed indoors.

The general shape of such portable grills consists of a circular grill or cooking pan, mounted upon a tripod-type support. This unit is somewhat bulky and takes up a rather large amount of storage space.

It is therefore among the principal objects of the present invention to provide a barbecue construction of the character described which may be stored in a minimum amount of space.

Another object of the present invention, is to provide a folding barbecue construction of the character described in which the legs may pivotally fold upon themselves, wherein the grill pan may pivotally fold upon the legs, and the entire unit may be placed in a small space or hung upon the wall.

A further object of the present invention lies in the use of simple construction comprising sheet metal and tubular metal stock without additional involved structure to accomplish the desired results.

Still a further object of the present invention lies in the provision of a folding barbecue construction of the character described, in which the bottom of the grill has an opening which may be uncovered to permit easy removal of the used charcoal fuel.

A preferred embodiment of the present invention comprises a circular dish-shaped charcoal grill having a bottom wall with a central opening. The grill also has a side wall to which is attached a channel mount. Pivotally secured to the bottom wall are a pair of symmetrical legs, being joined at a central point by a pivot, and having wheels at the lower ends thereof with an axle extending therebetween. Pivotally secured to said legs at their centrally located pivot point is a support leg having a horizontally rotatable leg secured to the lower end thereof and having a flattened upper end shaped to be received in said channel mount located on the side wall of the grill.

In a normal operational position the grill lies horizontally upon the erected tripod supports, the upper flattened end portion of the support leg being securely engaged in the channel mount. To further rigidify the support members, there is secured to the symmetrical legs of the support an engaging member made of spring steel, and having upwardly extending parallel ears with edges defining vertical slots therein. When the unit is in operational position, these slots are engaged by corresponding projections positioned upon the support leg. When it is desired to place the barbecue in storage condition, the upper end of the support leg is disengaged from the support mount, the projections on the support leg being disengaged from the ears of the spring steel member and the three legs folded against the bottom of the grill, with the handle pointing upward so that the unit may be carried to a storage location.

The bottom of the grill has a centrally located opening through which means passes to raise and lower the grating of the grill. The said means is controlled by a handle which is secured in a pivotal fashion to the grill. The opening is covered by a dish, over which is placed a thick grating and having a wick passing through one of the openings into the interior of the dish. Liquid fuel may be placed in this dish and ignited, the fuel passing in between the charcoal as fumes evaporated from the wick, thus facilitating the firing of the charcoal. Since the means for raising and lowering the main grating is pivotally mounted to the grill, the grill can be tilted upwardly, thus carrying the dish upwardly, and thus allowing the spent charcoal fuel to be removed from the grill by the lower central opening.

These objects and features, as well as other incidental ends and advantages, will more fully appear in the progress of the following disclosure, and be pointed out in the appended claim.

In the drawings, to which reference will be made in this specification, similar reference characters have been employed to designate corresponding parts throughout the several views.

FIGURE 1 is a perspective view of a barbecue construction embodying the present invention.

FIGURE 2 is a fragmentary side elevational view showing the operational position of the upper ends of the supporting legs, showing the support in normal operational position.

FIGURE 3 is a fragmentary side elevational view, similar to FIGURE 2, but showing a support leg just subsequent to disengagement from the support mount and the spring steel member.

FIGURE 4 is a fragmentary front elevational view showing the upper end of the support leg received within the support mount.

FIGURE 5 is an enlarged sectional view as seen from the plane 5—5 in FIGURE 1.

FIGURE 6 is an enlarged sectional view as seen from the plane 6—6 in FIGURE 4.

Figure 7:
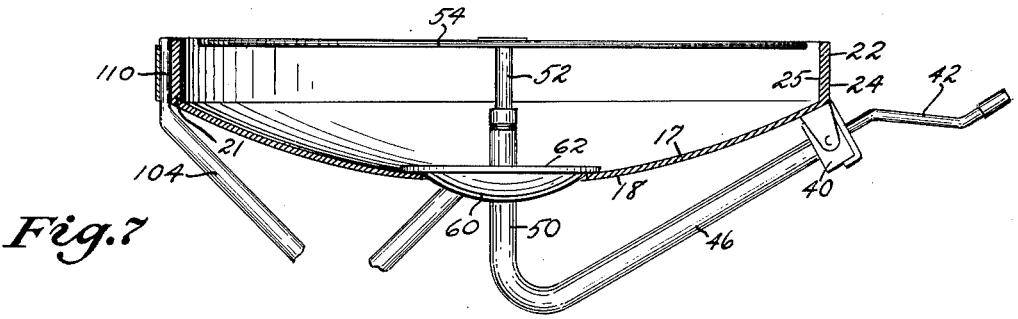
FIGURE 7 is a partial cross-sectional view as seen from the plane 7—7 in FIGURE 1.

The device, generally designated by reference character 10, consists of a grill element 12 and a support element 14. The grill element is preferably in the generally accepted cylindrical dish-shape, and the support is of the tripod-type well known in the art.

More particularly, the grill 12 includes a dish-shaped conical bottom wall 16 with a top surface 17 and a bottom surface 18. An opening 19 is centrally located in the bottom wall and is defined by circular edge 20. Extending from peripheral edge 21 of the wall 16 is upstanding cylindrical side wall 22 having an outer surface 24 and an inner surface 25.

A handle 29, which may be of any convenient shape and is here pictured as being continuously curved with inwardly extending arms, may be secured to side wall 22 by a convenient means, such as rivets 30. The handle 29 is so positioned on the side wall so that it will be in an uppermost position, suitable for carrying or hanging when the device 10 is in its folded or collapsed condition. Also mounted on outer surface 24 of side wall 22, diametrically opposed to handle 29, is a channel mount 32. Said channel mount 32 defines an interior through opening 33, being rectangular in cross section. The mount 32 is secured to the side wall 22 by means of rivets 34.

Mounted on the bottom surface 18 of the bottom wall 16, offset from the handle 29, are a pair of trunnions 36, pivotally carrying a screw fed bearing box 40 by means of pivots 38. Extending upwardly and outwardly from said bearing box is a handle 42, and extending downwardly is a housing 44 having a first straight portion 46, a curved portion 48, and a second straight portion 50. Extending upwardly from the second straight portion 50 of the housing 44 is shaft 52 upon which a grating 54 is mounted. By rotating the handle 42 in a clockwise or counterclockwise direction, shaft 52 will be either raised or lowered according to well-known means, such as a worm gear driving a series of moving objects (not shown) against the shaft 52.

The grating member 54 is of the circular shape usual for such units, and includes a hinged section 56 to allow ingress of fuel into the interior of the grill. A finger 58 maintains hinge section 56 in coplanar relationship within the plane of the grating 54.

Secured to the second straight portion 50 of housing 44 and covering the opening 19 is fuel dish 60 for a purpose hereinafter appearing. Said fuel dish has a peripheral annular flange 61 upon which a grating 62 rests. The grating is formed in a rhomboid pattern, and has a narrow opening to prevent pieces of charcoal fuel resting thereon from falling into the fuel dish. Extending through the grating, passing from the interior of the fuel dish into the interior of the grill is a wick 64.

Diametrically mounted on the bottom surface 18 of bottom wall 16, at an angle with respect to the handle 29, are ear mounts 66 and 68. Legs 70 and 72 are pivotally secured to said ear mounts, and are symmetrical in configuration. Said legs have inwardly and downwardly extending first portions 74 and 75 and come closest to each other at fold portions 76 and 78 thereof. A pintle 80 is located at said folds and depending from said folds are downwardly and outwardly extending second portions 82 and 83, terminating in end portions 84 and 86, to which are attached wheels 88 and 90. Said wheels and said end portions are connected and reinforced by an axle 92 extending therebetween. Mounted on said second portions 82 and 83 near folds 76 and 78 is a spring steel plate 94, of generally truncated triangular configuration. The plate 94 is secured to legs 70 and 72 at one end by rivets 96, and has laterally extending ears 98 at the other end having edges defining slots 100.

Pivotally secured to legs 70 and 72 by a pintle 80 is a support leg 102 including a central straight portion 104, a lower end 106 with a pivotal wheel 108 mounted thereon, and a flattened upper end 110. Located on said central straight portion 104, below pivot 80, are a pair of projections 112, adapted to be received within slots 100 in the ears 98.

When it is desired to erect the device 10 for use, the support legs are placed in the normal tripod position with projections 112 being received within slots 100 of ears 98, and the flattened end portion 110 of support legs being received within through the opening 33 in the channel mount 32 as shown in FIGURE 2. Grating 62 is then lifted, and placed upon the fuel dish 60, resting on flange 61, after which charcoal fuel 65 is placed at the interior of the grill covering the grating, with the wick 64 extending past the charcoal. The fuel passes upwardly from the fuel dish by means of the wick, between the charcoal pieces as fumes, and by igniting the wick, the fumes are ignited and the firing of the charcoal is greatly facilitated.

Figure 8:
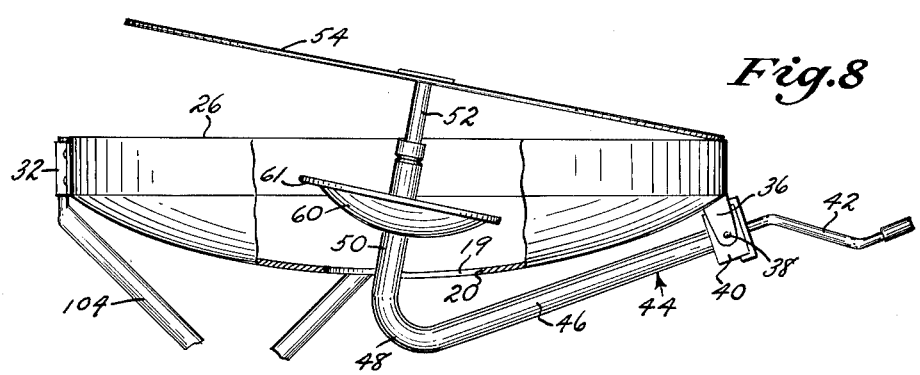
FIGURE 8 is a sectional view, similar to FIGURE 7 but showing the upper grating, grating elevating means, and fuel dish in upper pivoted position, exposing the lower central opening in the bottom wall of the grill.

After the cooking has been completed, the spent charcoal fuel may be emptied from the grill in the following manner. As shown in FIGURE 8, a force is applied to the handle 42, thus pivoting housing 44 at pivots 38, and accordingly raising the fuel dish 60 upwardly and away from the central opening 19. It is then possible to simply move the charcoal toward the central opening to be emptied into a convenient container placed therebelow. Another possible method of emptying the grill is to disengage the flattened end portion 110 from the through receptacle 33 and then pivot the grill by means of ear mounts 66 and 68, pivoting housing 44 at 38 to handle 42, and simply dumping the spent charcoal into a container.

To place the unit in a folded condition, the flattened end portion 110 of support leg 102 is disengaged from the through opening 33 of channel mount 32. Projections 112 are also disengaged from slots 100 of the ears 98, as shown in FIGURE 3. From the position seen in FIGURE 3, the grill is then rotated in a counterclockwise direction, the support leg 102 and the legs 70 and 72 being moved against the bottom wall 16 of the grill, so that the unit will assume the configuration shown in FIGURE 9. The unit may then be carried by the handle 29, and stored by either placing the same on a floor, or by hanging it from a wall by handle 29.

Figure 9:
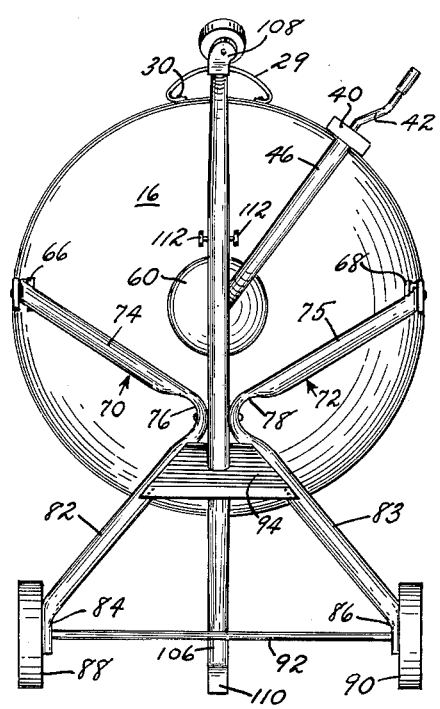
FIGURE 9 is a side elevational view of the barbecue construction in collapsed condition.
Figure 10:
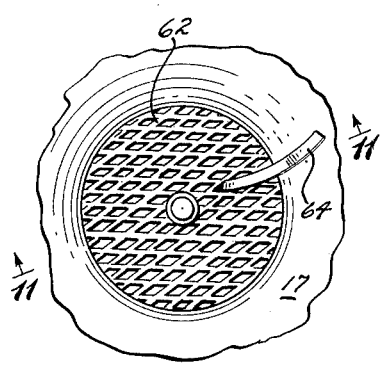
FIGURE 10 is an enlarged top plan view, with the upper grating removed, of the fuel dish grating and the fuel wick extending therefrom.
Figure 11:
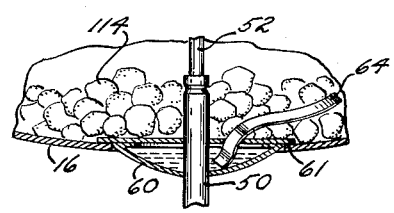
FIGURE 11 is a fragmentary cross-sectoinal view taken along the plane 11—11 as seen in FIGURE 10.

When setting up the present device, from the closed or collapsed position, shown in FIGURE 9, it is convenient to pull its end 106 down, thereby pivoting the parts about pivot 80 so that the projections 112 ride up over the cam portions of the outer ears 98 (to the right on FIGURE 2), the plate 94 being resiliently deflected so that a latching snap action is obtained automatically. The grill element 12 is then pivotally lowered about the ear mount 66 and 68 and the channel mount 32 interengaged with the end 110. The deflectability of the plate 94 and ears 98 is schematically indicated by dot-dash lines on FIGURE 2.

Thus it is seen that there is provided a novel construction forming a portable barbecue grill which, when not in use, may be placed in a generally planar condition occupying a minimum amount of space. The novel construction facilitates the firing of the charcoal fuel, and emptying out the spent charcoal.

Having illustrated and described the invention, it is to be understood that the same is capable of variation and modification, and I, therefore do not consider the invention limited to the precise details set forth in this specification, but desire to avail myself of such changes and alternations as fall within the scope of the following claim.

I claim:

A portable grill comprising:
(a) a grill element including a bottom wall and a side wall, a channel mount secured to said side wall, said channel mount defining a through receptacle having a substantially rectangular cross section;
(b) means to support said grill, said means comprising two symmetrical legs pivotally secured to the bottom wall of said grill, having inwardly extending first portions, fold portions, and outwardly extending second portions, and end portions joined by an axle, wheels secured to said end portions and maintained by said axle therebetween, and a support leg pivotally secured to said two legs at said fold portions;
(c) said support leg having a flattened upper end portion shaped for detachable interengagement with said channel mount, a straight central portion, and a lower end portion, a pivotal wheel depending from said lower end portion, and a pair of projections secured to said central portion; and
(d) a spring plate means secured to said outwardly extending portions of said symmetrical legs near said fold portions, said plate means having parallel ears with edges defining slots shaped for interengagement with said projections on said support leg.

(References on following page)

References Cited by the Examiner

UNITED STATES PATENTS

| | | | |
|---|---|---|---|
| 706,937 | 8/02 | Hellenkamp | 248—431 |
| 1,577,814 | 3/26 | Sholar | 126—245 |
| 2,403,134 | 7/46 | Stephenson | 126—25 |
| 2,950,711 | 8/60 | Terry | 126—25 |
| 2,986,138 | 5/61 | Moore et al. | 126—25 |
| 2,994,315 | 8/61 | Bussing | 126—25 X |
| 3,008,463 | 11/61 | Frank | 126—9 |
| 3,018,771 | 1/62 | Curtis | 126—25 X |

JAMES W. WESTHAVER, *Primary Examiner.*